(12) United States Patent
Niwa et al.

(10) Patent No.: US 9,054,620 B2
(45) Date of Patent: Jun. 9, 2015

(54) MOTOR DRIVING DEVICE INCLUDING ELECTRIC STORAGE DEVICE

(71) Applicant: FANUC CORPORATION, Minamitsuru-gun, Yamanashi (JP)

(72) Inventors: Masakazu Niwa, Yamanashi (JP); Koujirou Sakai, Yamanash (JP)

(73) Assignee: FANUC CORPORATION, Yamanashi (JP)

(*) Notice: Subject to any disclaimer, the term of this patent is extended or adjusted under 35 U.S.C. 154(b) by 65 days.

(21) Appl. No.: 13/943,419

(22) Filed: Jul. 16, 2013

(65) Prior Publication Data
US 2014/0021888 A1 Jan. 23, 2014

(30) Foreign Application Priority Data

Jul. 17, 2012 (JP) ................. 2012-158483

(51) Int. Cl.
*H02J 7/02* (2006.01)
*H02P 27/00* (2006.01)
(Continued)

(52) U.S. Cl.
CPC ............... *H02P 27/00* (2013.01); *H02P 27/06* (2013.01); *H02P 29/022* (2013.01); *H02P 2201/09* (2013.01); *H02J 1/108* (2013.01); *H02J 9/061* (2013.01)

(58) Field of Classification Search
CPC ........ H02J 9/08; H02J 7/0013; Y02E 10/563; Y02E 10/566; Y02E 10/763; Y02E 60/721; Y02E 70/145; B60L 11/1803; B60L 11/1811; B60L 11/1814; B60L 11/1816; B60L 11/1838; B60L 11/1842; B60L 11/185; H01M 10/465
USPC ......... 320/109, 127, 118, 104, 123, 128, 129, 320/132; 307/9.1; 318/139, 803, 800; 340/636.1, 636.13, 636.15, 636.16, 340/636.17, 636.19; 361/212, 229, 225, 361/213; 327/533, 531
See application file for complete search history.

(56) References Cited

U.S. PATENT DOCUMENTS 5,642,270 A * 6/1997 Green et al. ..................... 363/17
5,710,699 A * 1/1998 King et al. ..................... 363/132
(Continued)

FOREIGN PATENT DOCUMENTS

JP 61267675 A 11/1986
JP 08054914 A 2/1996
(Continued)

OTHER PUBLICATIONS

Office Action mailed Jan. 7, 2014, corresponds to Japanese patent application No. 2012-158483.
(Continued)

*Primary Examiner* — Rita Leykin
(74) *Attorney, Agent, or Firm* — Lowe Hauptman & Ham, LLP

(57) ABSTRACT

A motor driving device includes a rectifier, an inverter connected to a DC link on a DC side of the rectifier, a power failure detecting unit for detecting a power failure on the alternating side of the rectifier, an electric storage device connected to the DC link, a charging unit that possesses a voltage boosting function of charging the electric storage device by direct current power at the DC link, a discharging unit that causes direct current power stored in the electric storage device to be discharged to the DC link, and a control unit that causes the charging unit to operate when the power failure detecting unit does not detect a power failure, or before start of motor drive, and causes the discharging unit and the inverter to operate when the power failure detecting unit detects a power failure.

3 Claims, 6 Drawing Sheets

(51) Int. Cl.
　　　*H02P 27/06*　　(2006.01)
　　　*H02P 29/02*　　(2006.01)
　　　*H02J 1/10*　　(2006.01)
　　　*H02J 9/06*　　(2006.01)

(56) References Cited

U.S. PATENT DOCUMENTS

| | | | | |
|---|---|---|---|---|
| 5,834,400 | A * | 11/1998 | Narayanan et al. | 504/363 |
| 5,903,449 | A * | 5/1999 | Garrigan et al. | 363/41 |
| 7,737,581 | B2 * | 6/2010 | Spurlin et al. | 307/66 |
| 8,143,856 | B2 * | 3/2012 | Andrea et al. | 320/128 |
| 8,761,978 | B2 * | 6/2014 | King | 701/22 |
| 8,896,263 | B2 * | 11/2014 | Riggio et al. | 320/107 |
| 2004/0245952 | A1 | 12/2004 | Yamada et al. | |
| 2010/0276993 | A1* | 11/2010 | King | 307/9.1 |
| 2012/0074901 | A1* | 3/2012 | Mohammed | 320/109 |

FOREIGN PATENT DOCUMENTS

| | | |
|---|---|---|
| JP | 11178245 A | 7/1999 |
| JP | 2002186171 A | 6/2002 |
| JP | 2003111493 A | 4/2003 |
| JP | 2004112929 A | 4/2004 |
| JP | 2004153883 A | 5/2004 |
| JP | 2004364457 A | 12/2004 |
| JP | 2009261161 A | 11/2009 |
| JP | 201093888 A | 4/2010 |
| JP | 2010233414 A | 10/2010 |
| JP | 2011130633 A | 6/2011 |
| JP | 2011193678 A | 9/2011 |

OTHER PUBLICATIONS

Office Action mailed Oct. 29, 2013, corresponds to Japanese patent application No. 2012-158483.

* cited by examiner

MOTOR DRIVING DEVICE INCLUDING ELECTRIC STORAGE DEVICE

RELATED APPLICATIONS

This application is a new U.S. patent application that claims benefit of JP 2012-158483, filed on Jul. 17, 2012, the content of JP 2012-158483 is incorporated herein by reference herein in its entirety.

BACKGROUND OF THE INVENTION

1. Field of the Invention

The present invention relates to a motor driving device that converts alternating current power supplied from an alternating side, into direct current power, outputs the converted direct current power, and then converts the output direct current power into alternating current power for driving a motor in order to supply the alternating current power to the motor. In particular, the present invention relates to a motor driving device that includes an electric storage device for performing protecting operation at the time of a power failure.

2. Description of the Related Art

A motor driving device driving a motor provided in a machine tool, a forge rolling machine, an injection molding machine, an industrial machine, or various types of robots once converts alternating current power input from an alternating side into direct current power, and then, further converts the direct current power into alternating current power to use the converted alternating current power as driving power for motors that are provided for driving shafts, respectively.

FIG. 6 illustrates a configuration of a general motor driving device that drives a plurality of motors. The motor driving device 100 includes a rectifier 11 and inverters 12. The rectifier 11 rectifies alternating current power from a commercial three-phase alternating current power supply 3 to output direct current power. The inverters 12 are connected to a direct current link 13 on a direct current side of the rectifier 11. The inverters 12 invert the direct current power output from the rectifier 11, into alternating current power having a desired voltage and a desired frequency that is supplied as driving power for the motors 2, or convert alternating current power regenerated from the motors 2, into direct current power. The motor driving device 100 controls speeds, or torque of the motors 2, or positions of rotors of the motors 2, the motor 2 being connected on alternating current sides of the inverters 12. The number of the inverters 12 is the same as the number of the motors 2 so that driving power can be individually supplied to the motors 2 provided for the plural corresponding drive shafts respectively to drive control the motors 2. In many cases, the number of the rectifier 11 is one of the plural inverters 12 in order to reduce cost and an occupied space of the motor driving device 100.

A higher-level controller 51 transmits a motor driving command to each inverter 12 to control operation of inverting direct current power into alternating current power, this operation (specifically, switching operation of switching devices in the inverter 12) being performed by the inverter 12. Thereby, the higher-level controller 51 controls each of the inverters 12 to invert direct current power in the direct current link 13 in order to output a desired alternating current power. The alternating electric current power output from the inverters 12 is used as driving electric current power by the motors 2 so that the motors 2 can operate. Accordingly, controlling the alternating current power output from the inverters 12 enables control of speeds, torque, or rotor positions of the motors 2 connected on the alternating current sides of the inverters 12. When the motor driving device 100 controls the motor 2 to be decelerated, the motor 2 regenerates electric current power. This regenerated electric current power passes through the inverter 12 to be returned to the direct current link 13.

According to the above-described motor driving device 100, when a power failure occurs on the alternating current side of the rectifier 11 to lower an input electric power supply voltage, normal operation of the motors 2 cannot be continued. This leads to an impediment such as breakage and deformation of the motor 2, the motor driving device 100 driving the motor 2, a tool connected to the motor 2 driven by the motor driving device 100, a machining target machined by the tool, a manufacturing line including the motor driving device 100, and the like. For this reason, a power failure detecting unit 52 is provided on an alternating current input side of the rectifier 11 to monitor whether or not a power failure occurs on the alternating current side of the rectifier 11. When the power failure detecting unit 52 detects occurrence of a power failure, it may be necessary to avoid or minimize the above-mentioned impediment.

For example, as described in Japanese Laid-open Patent Publication No. H11-178245, in order to perform protecting operation at the time of power failure, an electric storage device is provided, via a charging unit and a discharging unit, in parallel, in the direct current link between the rectifier and the inverter. In a normal state (i.e., when a power failure does not occur), direct current output in the direct current link is stored in the electric storage device via the charging unit. When a power failure occurs, the stored direct current power is discharged to the direct current link via the discharging unit so that energy for protecting operation can be supplied to the motor via the inverter.

FIG. 7 is a circuit diagram schematically illustrating the charging unit in the invention described in Japanese Laid-open Patent Publication No. H11-178245. FIG. 8 is a circuit diagram schematically illustrating the discharging unit in the invention described in Japanese Laid-open Patent Publication No. H11-178245. According to the invention described in Japanese Laid-open Patent Publication No. H11-178245, the charging unit 60 is configured by a series circuit constituted by a switch 61, a current limiting resistance 62, and a diode 63. The diode 63 prevents energy from reversely flowing from the electric storage device to the direct current link when a voltage at the direct current link becomes lower than a voltage at the electric storage device due to voltage fluctuation at the commercial three-phase alternating current power supply (not illustrated), or an operational matter of the inverter (not illustrated). At the time of charging the electric storage device (not illustrated), a voltage at the direct current link (i.e., direct-current-side output of the rectifier) is compared with a voltage at the electric storage device. When a voltage at the electric storage device is lower than a voltage at the direct current link, the switch 63 is closed (turned on) to bring in direct current power to the electric storage device. Thereby, the electric storage device is charged. The discharging unit 70 includes a thyristor 71 and an inductor 72. At the time of a power failure, the thyristor 71 is turned on to make a short-circuit between the direct current link and the electric storage device. Thereby, direct current power stored in the electric storage device is supplied to the direct current link.

Further, for example, as described in Japanese Laid-open Patent Publication No. S61-267675, a storage battery is provided between a rectifying circuit and a voltage inverter so that at the time of a power failure, electric power of the storage battery can be supplied to a motor to continue operation of the motor. Thereby, an elevator can safely arrive at a floor.

Furthermore, for example, as described in Japanese Laid-open Patent Publication No. 2009-261161, a condenser (electric storage device) is provided between a converter unit (rectifier) and an inverter unit (inverter). Energy stored in the condenser is used for continuing operation of a motor, when a voltage drop on the direct current side of the rectifier is detected, the voltage drop being caused by a decrease in alternating current voltage on the alternating current side of the rectifier.

Further, for example, as described in Japanese Laid-open Patent Publication No. H8-54914, at the time of a power failure on the alternating current input side, a motor is decelerated so that power regenerated at the time of decelerating the motor is used as an energy for protecting operation.

As described above, according to the above-described motor driving device, when a power failure occurs on the alternating current side of the rectifier to lower an input electric power supply voltage, normal operation of the motor cannot be continued. This leads to occurrence of an impediment such as breakage and deformation of the motor, the motor driving device driving the motor, a tool connected to the motor driven by the motor driving device, a machining target machined by the tool, a manufacturing line including the motor driving device, and the like. For this reason, a power failure detecting unit is provided on an alternating current input side of the rectifier to monitor whether or not a power failure occurs on the alternating current side of the rectifier. When the power failure detecting unit detects occurrence of a power failure, protecting operation for avoiding or minimizing the above-mentioned impediment may be needed.

According to the invention of the above-mentioned Japanese Laid-open Patent Publication No. H11-178245, the electric storage device cannot be charged when a voltage at the direct current link is not higher than a voltage at the electric storage device. Accordingly, as a design, a voltage at the electric storage device cannot be made equal to or higher than a direct current output voltage of the rectifier (i.e., a crest value of a voltage at a commercial three-phase alternating current power supply). When the electric storage device is configured by a condenser, for example, energy E that can be stored in the condenser is represented by the following expression (1) where the symbol C designates a capacity of the condenser, the symbol V designates a condenser voltage (i.e., a voltage at the electric storage device).

$$E = \frac{1}{2}CV^2 \qquad (1)$$

It is assumed that in order to secure energy for performing protecting operation at the time of a power failure, energy E stored in the electric storage device is made as high as possible. However, on this assumption, a capacity C of the condenser is increased due to a restriction that a voltage at the condenser cannot be made equal to or higher than a direct current output voltage of the rectifier (i.e., a crest value of a voltage at commercial three-phase alternating current power supply) as described above. For this reason, according to the invention described in Japanese Laid-open Patent Publication No. H11-178245, a volume and cost of the electric storage device (condenser) is increased. Furthermore, this leads to an increase in volume and cost of the motor driving device including the electric storage device (condenser), as well. Likewise, the invention described in Japanese Laid-open Patent Publication No. S61-267675 has the same problem, in other words an increase in volume and cost of the electric storage device and the motor driving device since the electric storage device is charged when a voltage at the direct current link is higher than a voltage at the electric storage device.

SUMMARY OF THE INVENTION

With the view of the above-described problem, an object of the present invention is to provide a compact and low-cost motor driving device that can supply, to a motor, an energy for performing protecting operation at the time of a power failure on an alternating current power supply side.

In order to accomplish the above-mentioned object, a motor driving device includes: a rectifier that rectifies alternating current power supplied from an alternating current side to output direct current power; an inverter that is connected to a direct current link on a direct current side of the rectifier and that mutually transforms electric power between direct current power at the direct current link and alternating current power that is driving electric power for a motor or electric power regenerated in the motor; a power failure detecting unit for detecting a power failure on the alternating side of the rectifier; an electric storage device that is connected to the direct current link and that includes a capacity for storing direct current power; a charging unit that possesses a voltage boosting function of charging the electric storage device to a voltage higher than a direct current voltage at the direct current link; a discharging unit for making a short-circuit between the electric storage device and the direct current link to cause direct current power stored in the electric storage device to be discharged to the direct current link; and a control unit that outputs a charging command for causing the charging unit to operate when the power failure detecting unit does not detect a power failure on the alternating side of the rectifier, or before drive of the motor is started, and outputs a discharging command for causing the discharging unit to operate and a predetermined motor driving command for causing the inverter to operate when the power failure detecting unit detects a power failure on the alternating side of the rectifier.

The predetermined motor driving command causes the inverter to invert direct current power at the direct current link into alternating current power allowing the motor to perform operation predetermined to be performed when a power failure occurs on the alternating side.

The motor driving device may further include a regenerated electric power consuming unit including an electric resistance and a switch that closes and opens an electric path between the electric resistance and the direct current link, wherein when receiving an electric resistance consuming start command, the switch closes the electric path, and when receiving an electric resistance consuming stop command, the switch opens the electric path; and a direct current voltage detecting unit detecting a direct current voltage at the direct current link. Preferably, when the power failure detecting unit detects a power failure on the alternating side of the rectifier, if a direct current voltage detected by the direct current voltage detecting unit is higher than a first threshold, the control unit transmits the electric resistance consuming start command to the regenerated electric power consuming unit, and if the direct current voltage detected by the direct current voltage detecting unit is lower than a second threshold that is less than the first threshold, the control unit transmits the electric resistance consuming stop command to the regenerated electric power consuming unit.

BRIEF DESCRIPTION OF THE DRAWINGS

The present invention would be more clearly understood by referring to the following attached drawings, in which.

DETAILED DESCRIPTION

In the following, a motor driving device including an electric storage device will be described with reference to the drawings. However, the present invention is not limited to the drawings and embodiments described below. In an embodied example described below, a motor driving device that controls drive of a plurality of motors will be described. However, the number of the motors to be driven and controlled does not limit a scope of the present invention.

Figure 1:
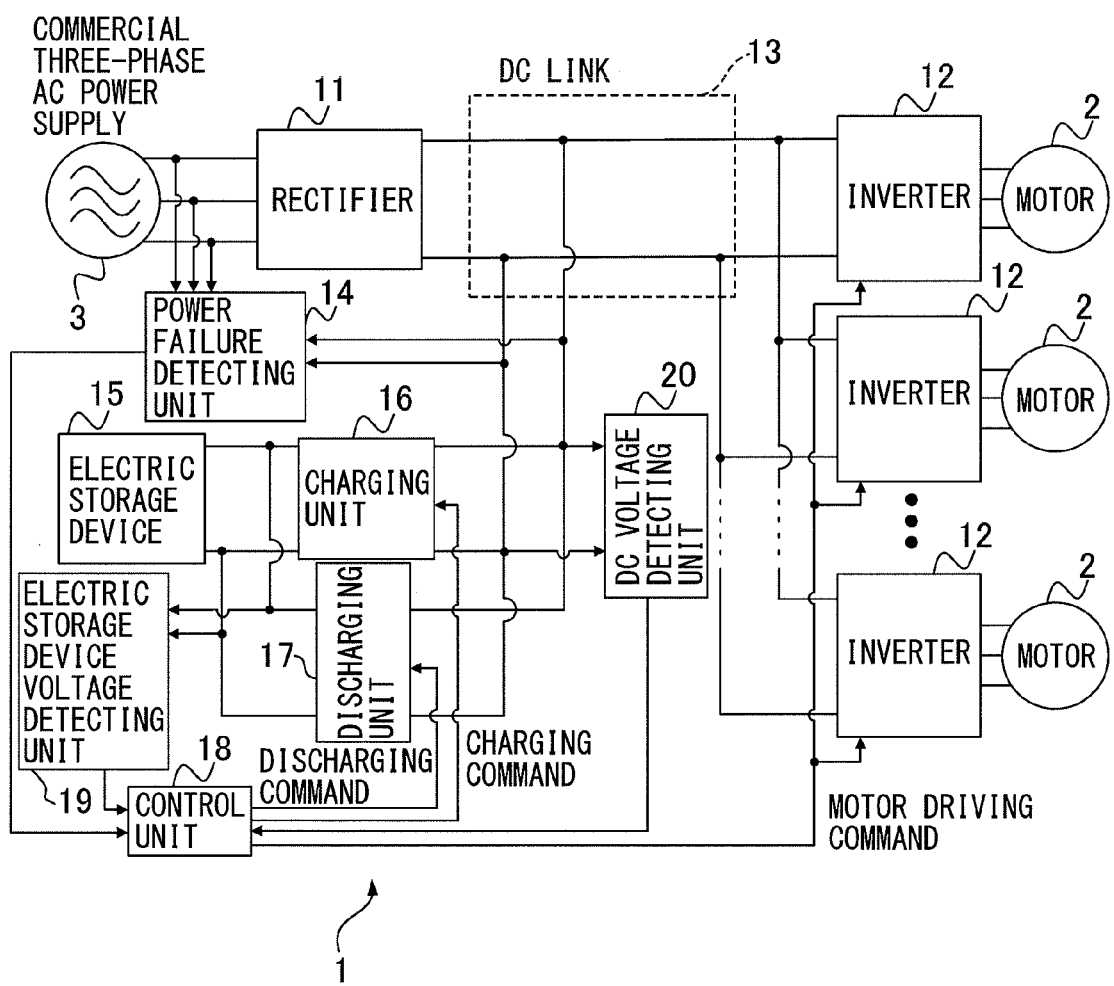
FIG. 1 is a circuit diagram illustrating a motor driving device according to a first embodied example.

FIG. 1 is a circuit diagram illustrating a motor driving device according to a first embodied example. In the following, constituting elements to which the same reference symbol is attached in the different drawings have the same function.

The motor driving device 1 for driving the motors 2 according to the first embodied example includes a rectifier 11, inverters 12, a power failure detecting unit 14, an electric storage device 15, a charging unit 16, a discharging unit 17, and a control unit 18. Further, the motor driving device 1 includes an electric storage device voltage detecting unit 19 for detecting a charged voltage at the electric storage device 15, and a direct current voltage detecting unit 20 for detecting a direct current voltage at a direct current link 13 between the rectifier 11 and the inverter 12.

The rectifier 11 rectifies an alternating current power supplied from a commercial three-phase alternating current power supply 3 to output direct current power. According to the present invention, an embodiment of the used rectifier 11 is not limited to a specific embodiment, and may be a three-phase full-wave rectifying circuit, a 120 degree current-carrying rectifying circuit, a PWM-controlled rectifying circuit, or the like.

The rectifier 11 and the inverters 12 are connected to each other via the direct current link 13. The inverters 12 are configured as an inverting circuit such as a PWM inverter, the inverter circuit including switching devices therein. In this example, the motor driving device 1 controls drive of a plurality of the motors 2, so that the inverter 12 is provided for each motor 2. On the basis of a motor driving command received from the control unit 18, the inverter 12 causes the switching devices therein to perform switching operation. Thereby, the inverter 12 inverts direct current power supplied from the side of the direct current link 13, into three-phase alternating current power having a desired voltage and a desired frequency for driving the motor 2. On the basis of the supplied three-phase alternating current power of which voltage and frequency can be changed, the motor 2 operates. At the time of braking of the motor 2, electric power is regenerated. On the basis of a motor driving command received from the control unit 18, the inverter 12 converts the alternating current power in other words the electric power regenerated in the motor 2 into direct current power to return the converted direct electric current power to the direct current link 13. Thus, on the basis of a received motor driving command, the inverter 12 performs mutual electric power transformation between direct electric power at the direct current link 13 and alternating current power that is driving electric power for the motor 2 or electric power regenerated in the motor 2.

The power failure detecting unit 14 is provided on the side of the commercial three-phase alternating current power supply 3 that supplies alternating current power to the rectifier 11. The power failure detecting unit 14 detects whether or not a power failure occurs on the alternating current side of the rectifier 11. A detection result of the power failure detecting unit 14 is transmitted to the control unit 18.

The direct current voltage detecting unit 20 detects a direct current voltage at the direct current link 13 between the rectifier 11 and the inverters 12. A detection result of the direct current voltage detecting unit 20 is transmitted to the control unit 18.

The electric storage device 15 is connected to the direct current link 13, and can store direct current power. The electric storage device 15 is configured by a condenser or the like, for example. The electric storage device 15 is provided with the electric storage device voltage detecting unit 19 for detecting a charged voltage. Information related to a charged voltage at the electric storage unit 15 detected by the electric storage device voltage detecting unit 19 is transmitted to the control unit 18.

When the charging unit 16 receives a charging command from the control unit 18, the charging unit 16 brings in direct current power at the direct current link 13 to the electric storage device 15 to charge the electric storage device 15. When the control unit 18 causes the electric storage device 15 to be charged, the control unit 18 compares a charged voltage at the electric storage device 15 detected by the electric storage device voltage detecting unit 19, with a direct current voltage at the direct current link 13 detected by the direct current voltage detecting unit 20 to generate a charging command for commanding the charging unit 16 to perform charging operation. The control unit 18 outputs the generated charging command to the charging unit 16. The charging unit 16 has a voltage boosting function of charging the electric storage device 15 at a voltage higher than a direct current voltage at the direct current link 13. The charging unit 16 is configured by a step-up/down chopper circuit, for example. Two concrete examples of the charging unit 16 configured by the step-up/down chopper circuit will be described.

Figure 2:
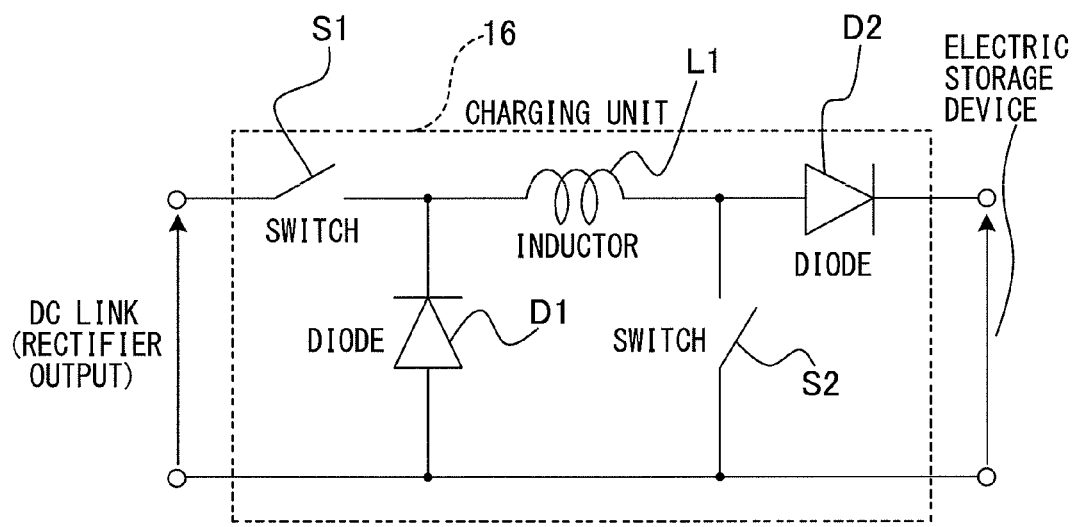
FIG. 2 is a circuit diagram illustrating a first concrete example of a charging unit in the motor driving device.

FIG. 2 is a circuit diagram illustrating a first concrete example of the charging unit in the motor driving device. As illustrated in FIG. 2, the charging unit 16 of the first concrete example includes switches S1 and S2, diodes D1 and D2, and the step-up/down chopper circuit including an inductor L1. When the control unit 18 causes the electric storage device 15 to be charged, the control unit 18 generates a charging command for controlling the switches S1 and S2 to be turned on and off. The control unit 18 generates the charging command on the basis of comparison between a charged voltage at the electric storage device 15 detected by the electric storage device voltage detecting unit 19 and a direct current voltage at the direct current link 13 detected by the direct current voltage detecting unit 20. When a charged voltage at the electric storage device 15 detected by the electric storage device voltage detecting unit 19 is lower than a direct current voltage at the direct current link 13 detected by the direct current voltage detecting unit 20, the control unit 18 causes the switch S2 to be always off, and controls the switch S1 to be turned on and off at a predetermined duty rate to charge the electric storage device 15. Then, when a charged voltage at the electric storage device 15 detected by the electric storage device voltage detecting unit 19 becomes higher than a direct current voltage at the direct current link 13 detected by the direct current voltage detecting unit 20, the control unit 18 causes the switch S1 to be always on, and controls the switch S2 to be turned on and off at a predetermined duty rate to charge the electric storage device 15. Such a charging unit 16 can charge the electric storage device 15 up to a voltage higher than a direct current voltage at the direct current link 13.

Figure 3:
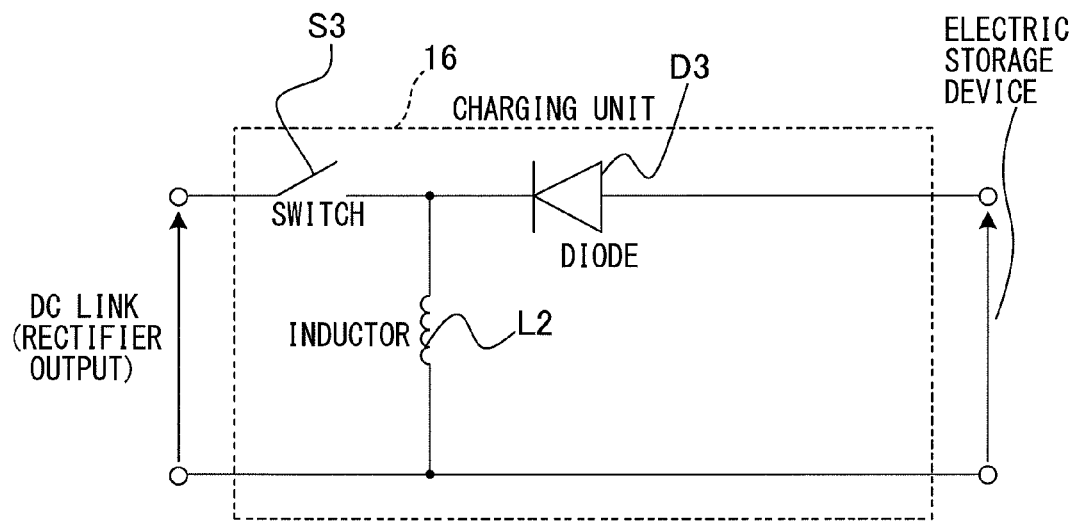
FIG. 3 is a circuit diagram illustrating a second concrete example of a charging unit in the motor driving device.

The above-described step-up/down chopper circuit is one concrete example, and other step-up/down chopper circuits may constitute the charging unit. FIG. 3 is a circuit diagram illustrating a second concrete example of the charging unit in the motor driving device. As illustrated as the second concrete example in FIG. 3, the charging unit 16 may be configured by a step-up/down chopper circuit including a switch S3, a diode D3, and an inductor L2.

Figure 8:
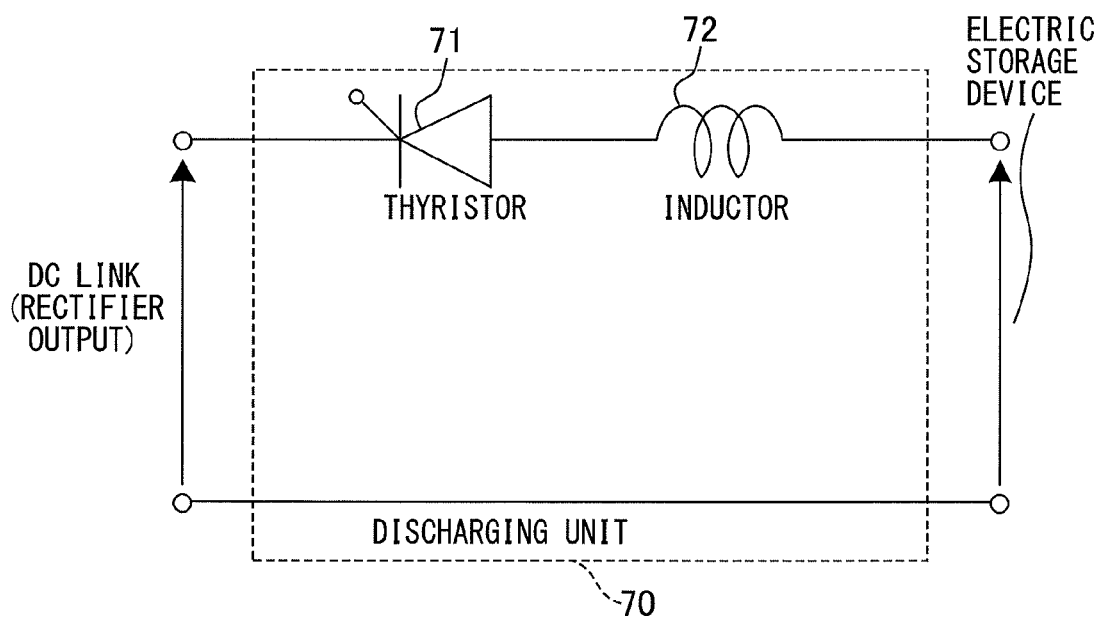
FIG. 8 is a circuit diagram schematically illustrating a discharging unit in the invention described in Japanese Laid-open Patent Publication No. H11-178245.

Returning to the description of FIG. 1, when the discharging unit 17 receives a discharging command from the control unit 18, the discharging unit 17 makes a short-circuit between the electric storage unit 15 and the direct current link 13 to discharge direct current power stored in the electric storage device 15 to the direct current link 13. For example, the discharging unit 17 may be the circuit described above referring to FIG. 8.

The control unit 18 generates a motor driving command, a charging command, and a discharging command as follows.

When the control unit 18 drives the motor 2 in a state where a power failure is not occurring on the alternating current side of the rectifier 11 (i.e., in a normal state), the control unit 18 outputs, to each inverter 12, a motor driving command of inverting direct current power into three-phase alternating current power having a desired voltage and a desired frequency for driving the motor 2. Thereby, on the basis of the received motor driving command, each inverter 12 inverts direct current power into alternating current power, and on the basis of this alternating current power, the motor 2 operates.

The control unit 18 transmits a charging command to the charging unit 16. Preferably, the control unit 18 transmits a charging command to the charging unit 16 before the control unit 18 starts to control drive of the motors 2. Thereby, the electric storage device 15 is charged at a voltage equal to or higher than a predetermined charge voltage. The electric storage device 15 can be charged up to a voltage higher than a direct current voltage at the direct current link 13 by a voltage boosting function of the charging unit 16, as described above. Accordingly, a voltage higher than a direct current voltage at the direct current link 13 can be set as the predetermined charge voltage. After drive control of the motors 2 is started, in the electric storage device 15, stored energy is gradually consumed due to loss caused by inner electric resistance. For this reason, during drive control of the motors 2 in a state where a power failure is not occurring (i.e., in a normal state), when a charged voltage at the electric storage device 15 detected by the electric storage device voltage detecting unit 19 becomes lower than the predetermined charge voltage, the control unit 18 transmits a charging command to the charging unit 16. Thereby, the electric storage device 15 is appropriately charged.

When the control unit 18 receives, from the power failure detecting unit 14, a signal indicating occurrence of a power failure on the alternating current side of the rectifier 11, the control unit 18 transmits a discharging command to the discharging unit 17, and transmits a predetermined motor driving command to the inverters 12. This predetermined motor driving command transmitted at this time of the power failure causes the inverters 12 to invert direct current power at the direct current link 13 into "alternating current power that allows the motors 2 to perform protecting operation that is predetermined to be performed at the time of a power failure on the alternating current side". In other words, the predetermined motor driving command transmitted at the time of a power failure is different from a motor driving command transmitted for driving the motors 2 in a state where a power failure is not occurring (i.e., in a normal state).

The protecting operation that is predetermined as operation performed at the time of a power failure on the alternating current side includes such as a retract control, a braking control, and a fall preventing control as described in Japanese Laid-open Patent Publication No. H11-178245. The retract control is performed in a machine tool where a workpiece and a tool are numerically controlled so as to be synchronized with each other. In retract control, at the time of a power failure, the workpiece and the tool are withdrawn to positions where the workpiece and the tool do not interfere with each other, while synchronization between the workpiece and the tool is maintained. Thereby, breakage due to out-of-synchronization between the workpiece and the tool can be prevented. The braking control is performed in a machine tool where a free-wheeling distance of a transfer shaft at the time of a power failure can cause a problem. In the braking control, the transfer shaft is decelerated to be stopped so that collision due to inertia transfer of the transfer shaft can be prevented from occurring. The fall preventing control is performed in a machine including a gravity shaft. In the fall preventing control, at the time of a power failure, a present position of the gravity shaft can be maintained so as to prevent the gravity shaft from falling. Thereby, damage to a workpiece and a tool is prevented.

In the above-described each protecting operation, alternating current power is consumed to drive the motor 2. For this reason, according to the present invention, when the control unit 18 receives, from the power failure detecting unit 14, a signal indicating occurrence of a power failure, the control unit 18 transmits, to the inverters 12, the above-described predetermined motor driving command for the protecting operation, and further transmits a discharging command to the discharging unit 17. Thereby, the inverters 12 can invert direct current power discharged to the direct current link 13 from the electric storage device 15 to output alternating current power that allows the motors 2 to be driven for performing the protecting operation. In this manner, the motors 2 can perform the protecting operation. As a result, it is possible to avoid an impediment such as damage and deformation of the motors 2 driven by the motor driving device 1, a tool connected to the motor 2, a machining target machined by the tool, a manufacturing line including the motor driving device 1, or the like.

Figure 4:
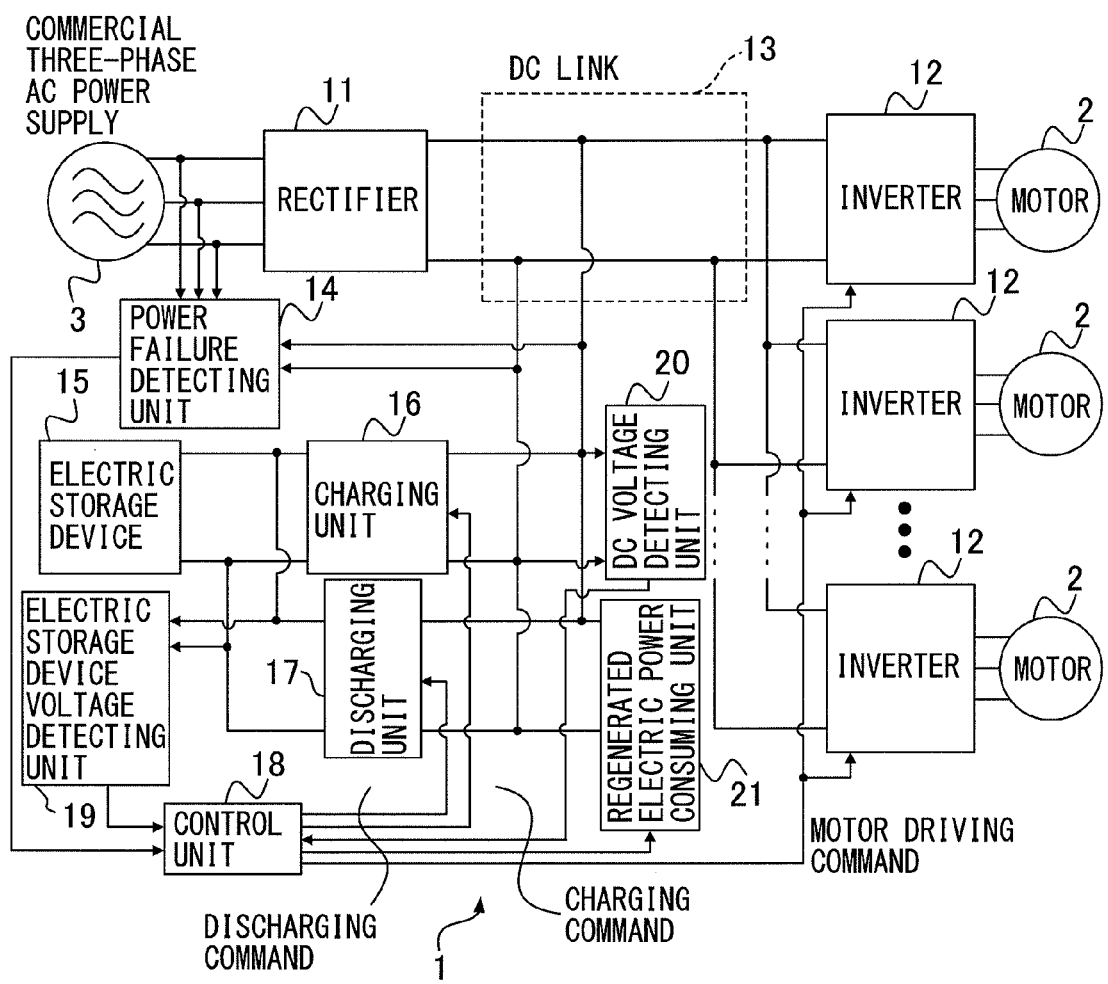
FIG. 4 is a circuit diagram illustrating a motor driving device according to a second embodied example.
Figure 5:
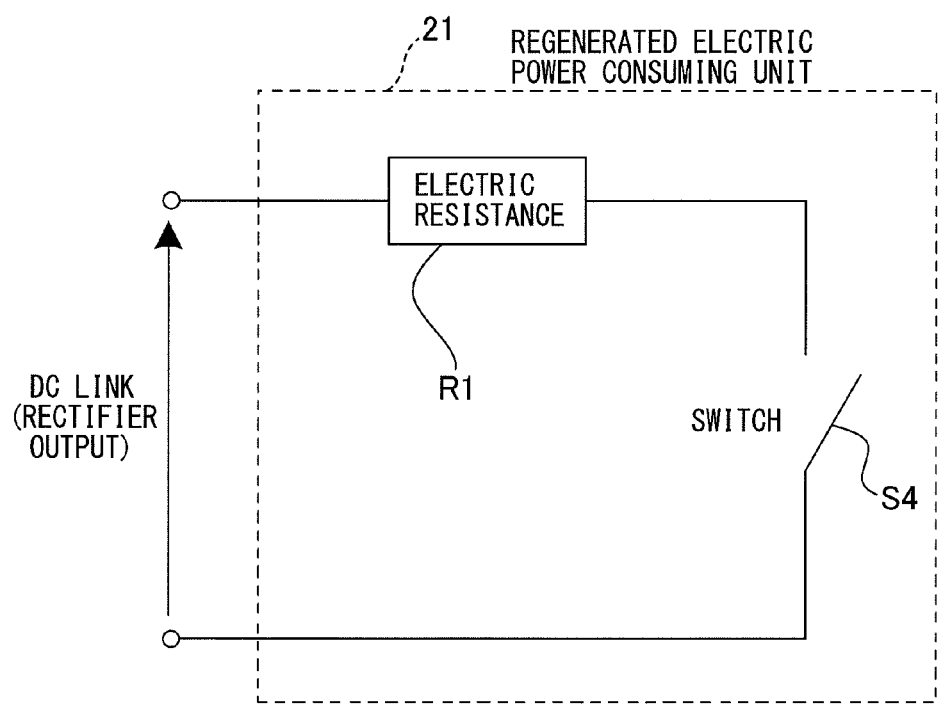
FIG. 5 is a circuit diagram illustrating a regenerated electric power consuming unit in the motor driving device according to the second embodied example.
Figure 6:
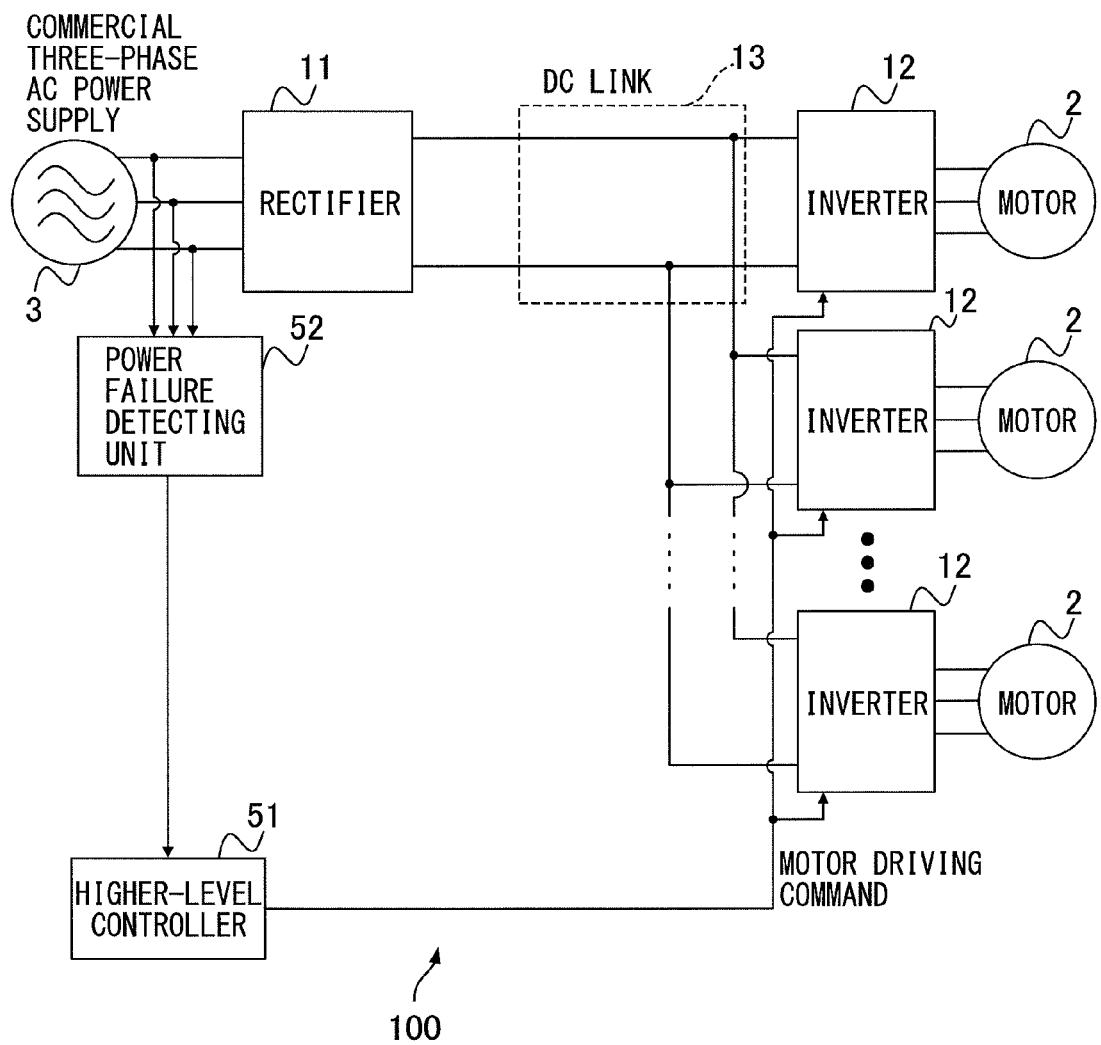
FIG. 6 illustrates a configuration of a general motor driving device that drives a plurality of motors.
Figure 7:
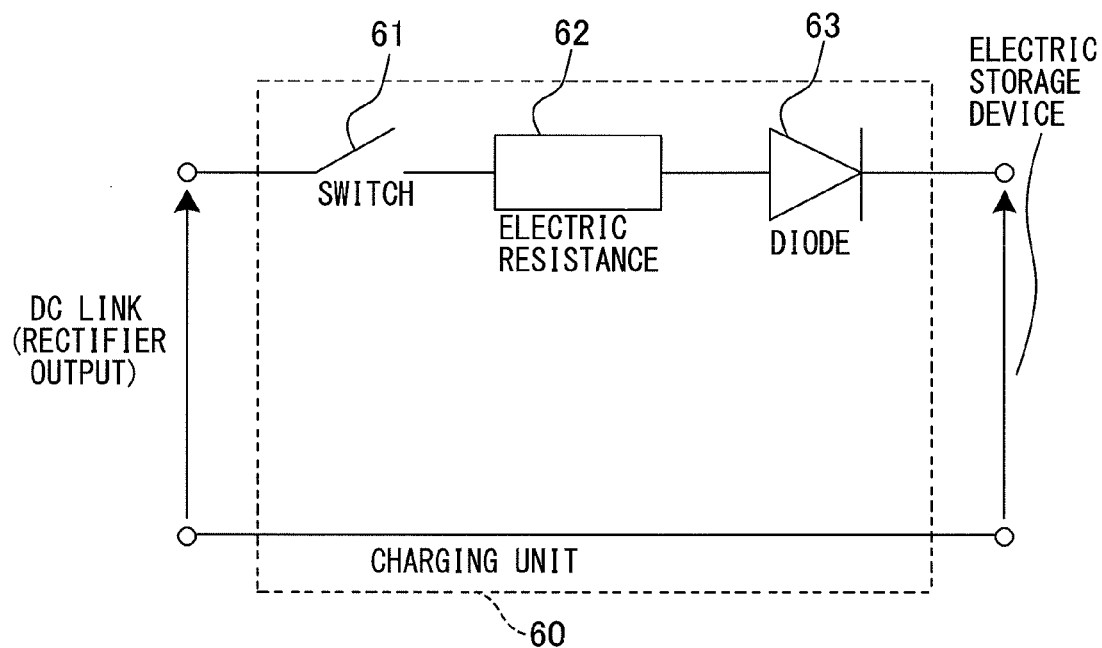
FIG. 7 is a circuit diagram schematically illustrating a charging unit in the invention described in Japanese Laid-open Patent Publication No. H11-178245.

FIG. 4 is a circuit diagram illustrating a motor driving device according to a second embodied example. FIG. 5 is a circuit diagram illustrating a regenerated electric power consuming unit in the motor driving device according to the second embodied example. A configuration of the second embodied example is made by adding the regenerated electric power consuming unit 21 to the configuration of the above-described first embodied example. When the motors 2 perform the protecting operation to be decelerated as described above, the motors 2 regenerate current power. The regenerated electric power is converted into direct current power by the inverters 12. As a result, an electric potential of a direct current voltage at the direct current link 13 rises. If the rising of the direct current voltage at the direct current link 13 caused by the regenerated electric power is uncontrolled, each of devices constituting the rectifier 11 or the inverters 12 can be broken by a voltage higher than a withstanding voltage thereof. For this reason, according to the second embodied example, the regenerated electric power consuming unit 21 is provided, and consumes, as heat energy, current power regenerated when the motors 2 perform the protecting operation to be decelerated. Thereby, rising in a direct current voltage at the direct current link 13 at the time of deceleration of the motors 2 can be suppressed. Since the circuit configuration elements other than the regenerated electric power consuming unit 21 and the control unit 18 are the same as the circuit configuration elements illustrated in FIG. 1, the same reference symbols are attached to the same circuit configuration elements, and detailed description of these same circuit configuration elements is left out.

The direct current voltage detecting unit 20 detects a direct current voltage at the direct current link 13 even at the time other than the time that drive of the motors 2 is normally controlled, in other words, even at the time of a power failure.

The regenerated electric power consuming unit 21 includes an electric resistance R1, a switch S4 that closes or opens an electric path between the electric resistance R1 and the direct current link 13. When the regenerated electric power consuming unit 21 receives an electric resistance consuming start command from the control unit 18, the switch S4 closes, and when the regenerated electric power consuming unit 21 receives an electric resistance consuming stop command from the control unit 18, the switch S4 opens.

When the power failure detecting unit 14 detects a power failure on the alternating current side of the rectifier 11, if a direct current voltage detected by the direct current voltage detecting unit 20 is larger than a predetermined first threshold, the control unit 18 transmits an electric resistance consuming start command to the regenerated electric power consuming unit 21. In response to this, when the regenerated electric power consuming unit 21 receives the electric resistance consuming start command from the control unit 18, switch S4 closes. As a result, energy that is direct current power after electric power regenerated in the motors 2 is converted into the direct current power and consumed in the form of heat energy at the electric resistance R1. Accordingly, rising in a direct current voltage at the direct current link 13 can be suppressed. As the energy consumption at the electric resistance R1 is promoted, a direct current voltage at the direct current link 13 gradually decreases. When a direct current voltage detected by the direct current voltage detecting unit 20 becomes lower than a predetermined second threshold that is less than the first threshold, the control unit 18 transmits an electric resistance consuming stop command to the regenerated electric power consuming unit 21. Thereby, the regenerated electric power consuming unit 21 opens the switch S4 to prevent a direct current voltage at the direct current link 13 from dropping to an undesirably low value. The first threshold and the second threshold can be appropriately set in accordance with a situation to which the motor driving device is applied, for example.

When energy is stored in an electric storage device for the purpose of continuing drive of a motor even at the time of a power failure as in the inventions described in Japanese Laid-open Patent Publication No. S61-267675 and Japanese Laid-open Patent Publication No. 2009-261161, a rating of a circuit device such as a switch, a diode and an inductor constituting a charging unit is set as the same as a rating of a device used in a converter or an inverter since the charging unit performs charging in accordance with a necessity even during drive control of the motor when a power failure is not occurring. Accordingly, it is difficult to make the charging unit smaller in size. Meanwhile, the motor driving device according to the present invention enables energy to be supplied to the motors from the electric storage device at the time that a power failure occurs, this energy allowing the motors to perform the protecting operation. Accordingly, it suffices that the electric storage device is charged before drive control of the motors is started, so that there are no specific time restrictions on charging completion. For this reason, a circuit device having a small current rating can be used in the charging unit, so that a size and cost of the charging unit can be easily made small and low, and a size and cost of the motor driving device can be made small and low, as well.

In addition, for example, when the electric storage device is a condenser, energy E that can be stored in the condenser is proportional to a square value of a condenser voltage as represented in the expression (1). As the electric storage device, a condenser with a rating voltage having a sufficient margin to the maximum of a normally expected voltage value of rectifier output (direct current link), in other words, the upper limit of fluctuation in a crest value of a commercial three-phase alternating current power supply is normally used. Accordingly, the condenser can be charged to a voltage as close to the rating as possible, by using the charging unit having the voltage boosting function that is provided in the motor driving device of the present invention. For this reason, stored energy per unit volume in the condenser can be maximized. Accordingly, a size and cost of the electric storage device (condenser) can be made small and low, and further, size and cost of the motor driving device including the electric storage device (condenser) can be reduced.

The present invention can be used as the motor driving device that drives the motor provided in a machine tool, a forge rolling machine, an injection molding machine, an industrial machine, or various types of robots. The motor driving device includes the rectifier that converts an input alternating current into an alternating current, and the inverters that invert the direct current output from the direct current converter into alternating currents respectively supplied as driving electric power for the respective motors. The present invention can be applied to a case of performing various types of the protecting operation for protecting the motor driven by this motor driving device, a tool connected to the motor, a machining target machined by the tool, a manufacturing line including the motor driving device, or the like when a power failure occurs on the alternating current side of the rectifier.

According to the present invention, the motor driving device includes a rectifier that rectifies alternating current power to output direct current power, an inverter that mutually transforms electric power between direct current power at the direct current link and alternating current power that is driving electric power for the motor or electric power regenerated in the motor, and an electric storage device that is connected to the direct current link and that stores direct current power. In such motor driving device, the electric storage device is charged by using the charging unit having the voltage boosting function of charging the electric storage device to a voltage higher than a direct current voltage at the direct current link. Accordingly, stored energy per unit volume in the electric storage device can be maximized. For this reason, size and cost of the electric storage device can be reduced, and further, size and cost of the motor driving device including the electric storage device can be reduced.

The energy allowing the motor to perform the protecting operation when a power failure occurs is supplied from the electric storage device. Accordingly, it suffices that the electric storage device is charged before drive control of the motors is started, so that there are no specific time restrictions on charging. For this reason, a circuit device having a small current rating can be used for the charging unit, so that size and cost of the charging unit can be easily reduced, and size and cost of the motor driving device can be reduced, as well.

Further, the regenerated electric power consuming unit is provided to thereby suppress rising in a direct current voltage at the direct current link caused by electric power regenerated when the motor performs the protecting operation to be decelerated. Accordingly, damage to devices in the motor driving device can be prevented.

The inventions described in Japanese Laid-open Patent Publication No. S61-267675 and Japanese Laid-open Patent Publication No. 2009-261161 aim to continue operation of a motor even at the time of a power failure on the alternating side. In these inventions, a rating of a circuit device such as a switch, a diode and an inductor constituting a charging unit is set as the same as a rating of a device used in a converter or an inverter since the charging device performs charging in accordance with a necessity even during drive control of the motor when a power failure is not occurring. Accordingly, it is difficult to reduce the size of the charging unit. Meanwhile, the motor driving device according to the present invention enables energy to be supplied to the motor from the electric storage device at the time that a power failure occurs, this energy allowing the motor to perform the protecting operation. Accordingly, it suffices that the electric storage device is charged before drive control of the motor is started, so that there are no specific time restrictions on charging completion. For this reason, a circuit device having a small current rating can be used in the charging device, so that size and cost of the charging device can be easily reduced, and further, size and cost of the motor driving device can be reduced, as well.

The invention claimed is:

1. A motor driving device comprising:
    a rectifier that rectifies alternating current power supplied from an alternating current side to output direct current power;
    an inverter that is connected to a direct current link on a direct current side of the rectifier and that mutually transforms electric power between direct current power at the direct current link and alternating current power that is driving electric power for a motor or electric power regenerated in the motor;
    a power failure detecting unit for detecting a power failure on the alternating current side of the rectifier;
    an electric storage device that is connected to the direct current link and that includes a capacity for storing direct current power;
    a charging unit that possesses a voltage boosting function of charging the electric storage device to a voltage higher than a direct current voltage at the direct current link and that has a circuit device having a small current rating smaller than a rating needed to charging the electric storage device during drive control of the motor when a power failure is not occurring;
    a discharging unit for making a short-circuit between the electric storage device and the direct current link to cause direct current power stored in the electric storage device to be discharged to the direct current link; and
    a control unit that outputs a charging command for causing the charging unit to operate before drive of the motor is started, and outputs a discharging command for causing the discharging unit to operate and a predetermined motor driving command for causing the inverter to operate when the power failure detecting unit detects a power failure on the alternating side of the rectifier.

2. The motor driving device according to claim 1, wherein the predetermined motor driving command causes the inverter to invert direct current power at the direct current link into alternating current power allowing the motor to perform operation predetermined to be performed when a power failure occurs on the alternating side.

3. The motor driving device according to claim 2, further comprising:
    a regenerated electric power consuming unit including an electric resistance and a switch that closes and opens an electric path between the electric resistance and the direct current link, wherein when receiving an electric resistance consuming start command, the switch closes the electric path, and when receiving an electric resistance consuming stop command, the switch opens the electric path; and
    a direct current voltage detecting unit detecting a direct current voltage at the direct current link,
    wherein when the power failure detecting unit detects a power failure on the alternating side of the rectifier, when a direct current voltage detected by the direct current voltage detecting unit is higher than a first threshold, the control unit transmits the electric resistance consuming start command to the regenerated electric power consuming unit, and when the direct current voltage detected by the direct current voltage detecting unit is lower than a second threshold that is less than the first threshold, the control unit transmits the electric resistance consuming stop command to the regenerated electric power consuming unit.

* * * * *